United States Patent [19]
Mathews

[11] Patent Number: 6,009,680
[45] Date of Patent: Jan. 4, 2000

[54] STRUCTURAL CLIP FOR USE IN ASSEMBLING WIRE FRAME STRUCTURES, WIRE FRAME STRUCTURE, AND METHOD OF ARRANGING COMPONENTS OF A WIRE FRAME STRUCTURE FOR PACKAGING

[76] Inventor: Linden H. Mathews, 3366 E. Fair Pl., Littleton, Colo. 80121

[21] Appl. No.: 08/837,648

[22] Filed: Apr. 3, 1997

Related U.S. Application Data

[60] Provisional application No. 60/024,127, Aug. 14, 1996.
[51] Int. Cl.[7] .................................................. A01G 17/04
[52] U.S. Cl. .................................. 52/665; 52/86; 52/677; 52/686; 52/712; 52/719; 47/45
[58] Field of Search ................................. 52/86, 665, 677, 52/686, 719, 712, 747.1; 47/45, 70; 248/27.8

[56] References Cited

U.S. PATENT DOCUMENTS

| | | | |
|---|---|---|---|
| 2,014,175 | 9/1935 | Hart | 47/45 X |
| 3,623,289 | 11/1971 | Lowery | 52/677 X |
| 4,012,867 | 3/1977 | Lainchbury et al. | 52/86 X |
| 4,110,951 | 9/1978 | Padrun | 52/686 |
| 4,860,489 | 8/1989 | Bork | 47/45 X |
| 5,107,654 | 4/1992 | Leonardis | 52/677 X |
| 5,179,799 | 1/1993 | Hillestad | 47/45 |

*Primary Examiner*—Christopher T. Kent
*Attorney, Agent, or Firm*—William E. Hein

[57] ABSTRACT

A plastic wire frame structural clip includes two pairs of diametrically opposed, equally spaced tapered slots formed longitudinally in a peripheral wall thereof for retaining wire frame members in place at their points of intersection. A wire frame structure employing the structural clip and a method for compactly arranging components of a domed wire frame structure for packaging are also disclosed.

11 Claims, 1 Drawing Sheet

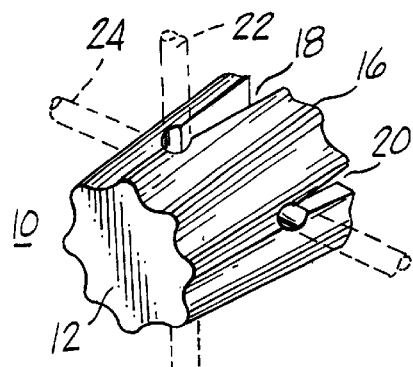
FIG. 1
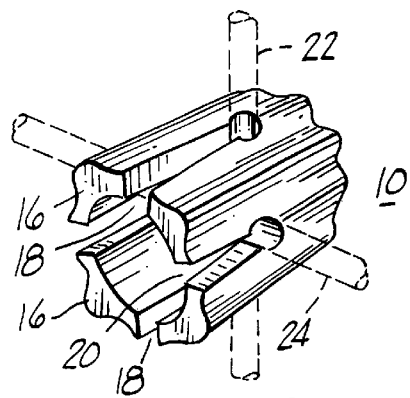
FIG. 2
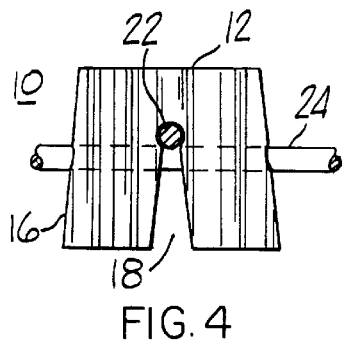
FIG. 4
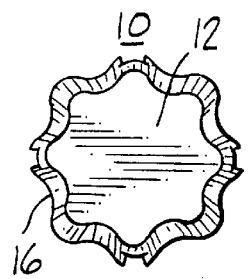
FIG. 3
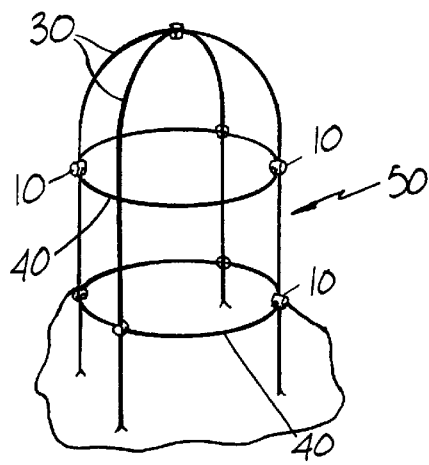
FIG. 5
FIG. 6
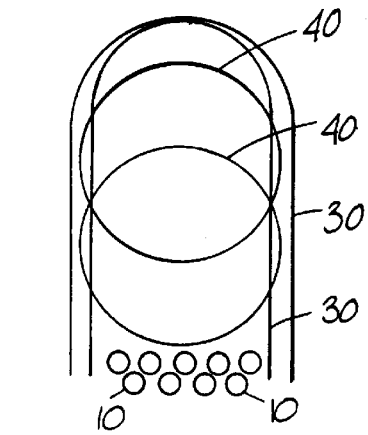
FIG. 7
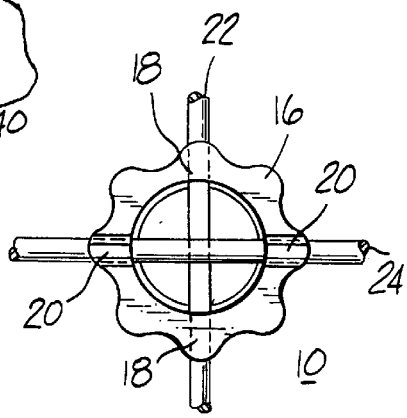
FIG. 8

6,009,680

STRUCTURAL CLIP FOR USE IN ASSEMBLING WIRE FRAME STRUCTURES, WIRE FRAME STRUCTURE, AND METHOD OF ARRANGING COMPONENTS OF A WIRE FRAME STRUCTURE FOR PACKAGING

REFERENCE TO RELATED PROVISIONAL APPLICATION

This application claims the benefit of U.S. Provisional Application No. 60/024,127 filed Aug. 14, 1996.

BACKGROUND AND SUMMARY OF THE INVENTION

This invention relates generally to wire frame structures of the type used by home gardeners and, more specifically, to a plastic clip employed to hold intersecting wires of these wire frame structures in place.

Wire frame structures are in widespread use in the home garden industry for protecting sensitive plants, such as tomatoes, from hail, frost, and other potentially destructive forces of nature. They are also widely used to provide a "hot house" environment for early season growing of plants, by supporting a plastic bag or some other translucent plastic material in a position surrounding the plants. These wire frame structures are also commercially available in the form of arbors and latticeworks. All of the commercially available wire frame structures of the type described above are disadvantageous in that they are typically fabricated using spot welding techniques for securing the individual wire members at their intersections. Since these prior art structures are available only in assembled form, they are bulky to transport and store.

It is therefore a principal object of the present invention to provide a wire frame structure that may be shipped unassembled in a substantially flat package, easily assembled by the home gardener, and just as easily disassembled for compact storage at the end of the growing season.

This and other objects are accomplished in accordance with the illustrated preferred embodiments of the present invention by providing a plastic structural assembly clip that serves to retain wire frame members in place at their points of intersection. Each of the clips is formed in the general shape of a cylindrical shell, open at one end and closed at the other end, a peripheral wall of the shell having two pairs of diametrically opposed, equally spaced slots formed longitudinally therein, each pair of slots being formed to different depths to retain the intersecting wire frame members without interference therebetween. Each of the slots is tapered and terminates at an interior end thereof in a circular notch portion having a diameter slightly larger than the width of the tapered slot at its narrowest point. This configuration allows each of the intersecting wire frame members to be snapped into the circular notch portion of the slot and to be securely retained therein until such time as the user chooses to disassemble the wire frame structure.

BRIEF DESCRIPTION OF THE DRAWINGS

FIG. 1 is a front perspective view of the wire frame structural clip of the present invention illustrating how it retains two intersecting wire frame members.

FIG. 2 is a rear perspective view of the wire frame structural clip of FIG. 1.

FIG. 3 is a front elevation view of the wire frame structural clip of FIGS. 1 and 2.

FIG. 4 is a top plan view of the wire frame structural clip of FIGS. 1 and 2.

FIG. 5 is a bottom plan view of the wire frame structural clip of FIGS. 1 and 2.

FIG. 6 is a pictorial diagram illustrating an assembled wire frame structure that employs the wire frame structural clip of FIGS. 1–5.

FIG. 7 is a pictorial diagram illustrating how the disassembled components of the wire frame structure of FIG. 6 may be arranged in a compact, substantially flat package for shipment and storage.

FIG. 8 is a rear elevation view of the wire frame structural clip of FIGS. 1 and 2.

DETAILED DESCRIPTION OF THE PREFERRED EMBODIMENT

Referring now to FIGS. 1–5 and 8, there is shown a wire frame structural clip 10 formed to have a flat front face 12 and a generally cyclindrical peripheral wall 16. The clip 10 is open at its rear. Two pairs of diametrically opposed, equally spaced slots 18 and 20 are formed longitudinally in the peripheral wall 16 to retain wire frame members 22 and 24, respectively. Each of the slots 18 and 20 is tapered from a larger opening width at the rear of clip 10 to a narrower width at an interior termination end of the slot. Each of the slots 18 and 20 terminates in a circular notch portion having a diameter slightly larger than the width of the slot adjacent its circular notch portion. Clip 10 is formed to include a void volume between the deepest pair of slots 18 and the inner surface of front face 12 to permit retention of curved intersecting wire frame members as illustrated in FIG. 6. Intersecting wire frame members 22 and 24 are inserted into their respective slots 18 and 20 and pressed for retention into the terminating circular notch portions of the slots. The pair of slots 18 is formed to a greater depth in the peripheral wall 16 of clip 10 than the pair of slots 20 so that the intersecting wire frame members 22 and 24 do not interfere with each other. The structural clips 10 may be fabricated using conventional plastic injection molding processes employing a resin that retains its resilience when exposed to exterior weather conditions, thereby permitting their reuse in subsequent seasons.

Referring now to FIG. 6, there is shown a domed wire frame structure 50 that is constructed using a pair of U-shaped wire frame members 30, a pair of circular wire frame members 40, and a plurality of structural clips 10 in accordance with the present invention that serve to retain the wire frame members 30 and 40 in place at each intersection thereof. Wire frame structures of many different shapes may be contructed in accordance with the teachings of the present invention by employing a plurality of wire frame members shaped such that, when assembled, they produce the desired structure. The structural clips 10 of the present invention may be employed in any desired wire frame structure to retain the plurality of wire frame members at selected ones or all of their points of intersection.

Referring now to FIG. 7, it may be seen how the disassambled wire frame members 30 and 40 and the structural clips 10 of the domed wire frame structure of FIG. 6 may be compactly arranged in a substantially flat package for shipment and storage.

I claim:

1. A clip for use in a wire frame structure for retaining wire frame members in place at their points of intersection in the structure, the clip comprising a generally cylindrical shell open at one end and closed at another end, a peripheral wall of the shell having two pairs of diametrically opposed, equally spaced slots formed longitudinally therein, each pair of slots being formed to different depths to retain a pair of intersecting wire frame members without interference therebetween, the clip being formed to include a void volume between the deepest pair of slots and said closed end to permit retention of curved intersecting wire frame members thereby.

2. A clip as in claim 1, wherein said generally cylindrical shell comprises a plastic material.

3. A clip as in claim 1, wherein each of said slots is tapered in width from an opening width to a narrower width proximate a termination end of the slot.

4. A clip as in claim 3, wherein each of said slots comprises a circular notch portion at said termination end, said circular notch portion having a diameter larger than said narrower width to retain one of said wire frame members within said circular notch portion.

5. A domed wire frame structure comprising:

a plurality of inverted U-shaped wire frame members coaxially positioned with respect to each other;

a plurality of circular wire frame members positioned horizontally in spaced relationship to each other and coaxially with respect to said U-shaped wire frame members along leg portions of said U-shaped wire frame members, each one of said U-shaped wire frame members intersecting each one of said circular wire frame members at two points of intersection; and a plurality of clip members, one of which is positioned at each point of intersection of said plurality of U-shaped wire frame members with said plurality of circular wire frame members to retain the U-shaped wire frame members and the circular wire frame members in place at every one of said points of intersection thereof, each of said plurality of clip members comprising a generally cylindrical shell open at one end and closed at another end, a peripheral wall of the shell having two pairs of diametrically opposed, equally spaced slots formed longitudinally therein, each pair of slots being formed to different depths to retain the U-shaped wire frame members and the circular wire frame members at said points of intersection without interference therebetween.

6. A domed wire frame structure as in claim 5, wherein each of said slots is tapered in width from an opening width to a narrower width proximate a termination end of the slot.

7. A domed wire frame structure as in claim 6, wherein each of said slots comprises a circular notch portion at said termination end, said circular notch portion having a diameter larger than said narrower width to facilitate retention of one of said wire frame members within said circular notch portion.

8. A wire frame structure comprising:

a plurality of wire frame members positioned with respect to each other to form the wire frame structure, the wire frame structure including a plurality of points of intersection between pairs of said plurality of wire frame members; and a plurality of clip members positioned at selected ones of said plurality of points of intersection to retain said plurality of wire frame members in place at each selected one of said plurality of points of intersection thereof, each of said plurality of clip members comprising a generally cylindrical shell open at one end and closed at another end, a peripheral wall of the shell having two pairs of diametrically opposed, equally spaced slots formed longitudinally therein, each pair of slots being formed to different depths to retain the wire frame members at said points of intersection without interference therebetween, each of the plurality of clip members being formed to include a void volume between the deepest pair of slots and said closed end to permit retention of curved intersecting wire frame members thereby.

9. A wire frame structure as in claim 8, wherein each of said slots is tapered in width from an opening width to a narrower width proximate a termination end of the slot.

10. A wire frame structure as in claim 9, wherein each of said slots comprises a circular notch portion at said termination end, said circular notch portion having a diameter larger than said narrower width to facilitate retention of one of said intersecting wire frame members within said circular notch portion.

11. A method for compactly arranging components of a domed wire frame structure for packaging, the method comprising:

providing a plurality of U-shaped wire frame members overlying one another in substantially planar relationship to each other;

providing a plurality of circular wire frame members overlying each other in substantially planar relationship to said plurality of U-shaped wire frame members; and providing a plurality of clip members arranged proximate said plurality of U-shaped wire frame members and said plurality of circular wire frame members, each of said clip members comprising a generally cylindrical shell open at one end and closed at another end, a peripheral wall of the shell having two pairs of diametrically opposed, equally spaced slots formed longitudinally therein.

* * * * *